3,574,511
Patented Apr. 13, 1971

3,574,511
COLORED POTASSIUM SULFATE AND
METHOD OF MANUFACTURE
Albert F. Boeglin, Carlsbad, N. Mex., assignor to
International Minerals and Chemical Corporation
No Drawing. Filed May 9, 1966, Ser. No. 548,383
Int. Cl. D06p 3/00, 5/00; C01d 5/00
U.S. Cl. 8—3                                    13 Claims

ABSTRACT OF THE DISCLOSURE

Potassium sulfate crystals containing in the lattice a small amount of dye to impart the desired colour are made by crystallizing the potassium sulfate from a saturated solution of potassium sulfate mother liquor containing a small amount of a sulfate or sulfonate radical-containing dyestuff and a small amount of a sulfate or sulfonate radical-containing surface-active agent.

---

Potassium sulfate manufactured in the United States finds its principal use as a fertilizer ingredient. The product generally is ultimately sold in admixture with other fertilizer ingredients as a blended fertilizer product. Because potassium sulfate is a premium fertilizer ingredient having agronomic characteristics for some uses superior to conventional potassic fertilizer materials (muriate of potash), it is sometimes desirable to impart a distinctive color to the product so that it can readily be identified even when in admixture with other fertilizer ingredients. In some instances it is desirable to formulate a multi-component fertilizer material which is uniform in color and appearance. In such instances, it is desirable to color all of the ingredients so that when in admixture they will be indistinguishable.

It is an object of this invention to provide a potassium sulfate product having uniform color dispersed throughout the crystal so that the color is not removed or altered by abrasions, or even by breakage of the crystals.

It is another object of this invention to provide a method for the manufacture of a potassium sulfate product of uniform color.

Potassium sulfate crystals of high purity can be manufactured by crystallization from an aqueous brine which is saturated with respect to potassium sulfate. In conventional practice, saturation of the brine during crystal formation can be maintained, for example, by cooling the brine from an elevated temperature to a lower temperature at which the potassium sulfate is less soluble. Of course, the mother liquor, when separated from the sulfate crystals, can be reheated and additional raw material, e.g., potassium sulfate of lesser purity, dissolved in this mother liquor, which is then recycled to the crystallization step.

A preferred method for the crystallization of potassium sulfate is by the metathetical reaction of a complex salt containing magnesium-potassium sulfate with potassium chloride. A preferred process for such a reaction is described in United States Patent No. 3,271,106, by Alfred Nylander. Other processes for the manufacture and crystallization of potassium sulfate from aqueous mother liquor and from complex potash salts and potassium chloride as starting materials will be found in the patent literature.

Complex salts containing magnesium sulfate and potassium sulfate occur naturally in many potash ores, such as the potash ores that are found in the European deposits and in the Permian Basin of the southwest area of the United States, and mined chiefly in the Carlsbad district of New Mexico. Such complex salts may also be recovered from brines and may be prepared from potash compounds. It is frequently desirable to separately recover the potassium values and/or magnesium values from these complex salts and many processes to effect the separation have been developed.

The potassium values in langbeinite ores, for example, are recovered by reacting langbeinite with an aqueous solution of potassium chloride to produce potassium sulfate. Potassium sulfate crystals form in the solution and are recovered. The potassium sulfate mother liquor can be processed by one or another procedure to recover the magnesium values therefrom. This prior process for the preparation of potassium sulfate from complex salts containing magnesium sulfate and potassium sulfate is practiced commercially.

Generally described, the product of the present invention is a crystalline potassium sulfate material consisting essentially of potassium sulfate crystals having dispersed therethrough a sulfate or sulfonate radical-containing dyestuff in the amount of from about 0.1 to about 1.0 pound per ton of product. This product is manufactured by the process of crystallizing potassium sulfate from an aqueous solution saturated with potassium sulfate and containing about 0.001 to about 0.05% by weight of a sulfate or sulfonate radical-containing dyestuff and about 0.025 to about 0.200% of a sulfate or sulfonate radical-containing surface-active agent.

Potassium sulfate crystallization steps may be carried out by cooling an aqueous salt solution of potassium sulfate from an elevated temperature to a low temperature in the presence of requisite quantities of the selected dyestuff and surface-active agent.

The preferred method of carrying out the instant invention is by metathetical reaction of a complex salt such as langbeinite, leonite, or schoenite with potassium chloride, followed by the crystallization of potassium sulfate in the presence of the requisite quantities of a selected dyestuff and surface-active agent. A specifically preferred process for the crystallization of potassium sulfate is that defined in the aforementioned application for patent S.N. 149,978, now U.S. Pat. 3,271,106.

It has been found critical to the practice of the instant invention that the dyestuff selected contain a sulfate or sulfonate radical, and that it be present in the aqueous solution from which the potassium sulfate product is crystallized in the amount of about 0.001 to about 0.05% by weight, and preferably in the amount of about 0.005 to about 0.01% by weight. It is likewise critical to the practice of the instant invention that the solution contain a requisite amount as about 0.025 to about 0.200% by weight of a sulfate or sulfonate radical-containing surface-active agent, and preferably of about 0.03 to about 0.06% by weight of the surface-active agent.

Exemplary sulfonate and sulfate radical-containing dyestuffs which may be used in accordance with the process of this invention are:

SULFONATE 1-amino-2-naphthol-4-sulfonic acid
1-nitroso-2-naphthol-3,6 disulfonic acid (sodium salt)
Trypan Red (colour Index No. 438)

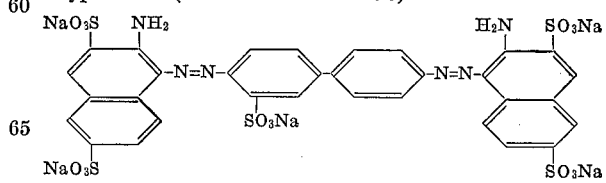

Edicol Amaranth (Colour Index No. 640) (sodium salt of 4-sulpho naphthalene-azo-naphthol-3,6 disulphonic acid)
Tartrazine (sodium salt of 4-p-sulphobenzene-azo-1-p-sulphophenyl-5-hydroxy-pyrazol 3-carboxylic acid)

Naphthol Green BNS (Colour Index No. 5)
Fast Yellow (Colour Index No. 16)
Naphthalene Fast Orange (Colour Index No. 441)
Azofuchsine G (Colour Index No. 153)
Ponceau 6R (Colour Index No. 186)
Chromazol Yellow (Colour Index No. 441)
Chlorzol Sky Blue (Colour Index No. 518)
Fast Light Yellow (Colour Index No. 636)
Lissamine Fast Yellow (Colour Index No. 639)
Disulphine Blue V (Colour Index No. 712)
Disulphine Blue AS (Colour Index No. 714)
Xylene Cyanol FF (Colour Index No. 715)

SULFATE

Anthrasol Printing Blue IGG (Colour Index No. 545)
Indigosol Yellow I2G

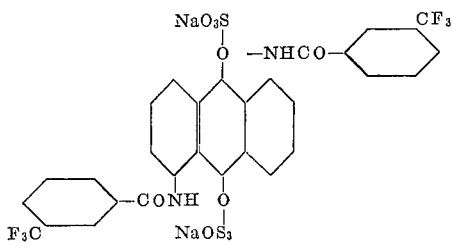

Anthrasol Brown IBR (Colour Index No. 539)
Algosol Blue 04B 5,5′,7,7′-tetrabromoindigo leuco sulfuric acid ester, sodium salt Surface-active agents suitable for use in accordance with this invention include the sodium, potassium and magnesium salts of acid sulfates and sulfonic acids of oleic acid, stearic acid, lauric acid, valeric acid, palmitic acid, capric acid, aproic acid, caprilic acid, heptylic acid, and sylvic acid. The following specfic compounds, not wthin the aforedefined class, are also useful in accordance with this invention. These compounds are: triethanol amine oleic acid sulfonate, disodium 4-dodecylated oxydibenzene sulfonate, and sodium dodecyl benzene sulfonate. Mixtures of the compounds defined individually or by class may be used.

Examples of specific compounds within the aforedefined class which are useful in accordance with this invention are:

SODIUM SALTS

Sodium oleic acid sulfonate
Sodium stearic acid sulfonate
Sodium lauric acid sulfonate
Sodium valeric acid sulfonate
Sodium palmitic acid sulfonate
Sodium capric acid sulfonate
Sodium caproic acid sulfonate
Sodium caprilic acid sulfonate
Sodium heptylic acid sulfonate
Sodium sylvic acid sulfonate
Sodium oleic acid sulfate
Sodium stearic acid sulfate
Sodium lauric acid sulfate
Sodium valeric acid sulfate
Sodium palmitic acid sulfate
Sodium capric acid sulfate
Sodium sylvic acid sulfate

POTASSIUM SALTS

Potassium oleic acid sulfonate
Potassium stearic acid sulfonate
Potassium lauric acid sulfonate
Potassium valeric acid sulfonate
Potassium palmitic acid sulfonate
Potassium capric acid sulfonate
Potassium caprilic acid sulfonate
Potassium caproic acid sulfonate
Potassium heptylic acid sulfonate
Potassium sylvic acid sulfonate
Potassium oleic acid sulfate
Potassium stearic acid sulfate
Potassium lauric acid sulfate
Potassium valeric acid sulfate
Potassium palmitic acid sulfate
Potassium capric acid sulfate
Potassium sylvic acid sulfate

MAGNESIUM SALTS

Magnesium oleic acid sulfonate
Magnesium stearic acid sulfonate
Magnesium lauric acid sulfonate
Magnesium valeric acid sulfonate
Magnesium palmitic acid sulfonate
Magnesium capric acid sulfonate
Magnesium caprilic acid sulfonate
Magnesium heptylic acid sulfonate
Magnesium caproic acid sulfonate
Magnesium sylvic acid sulfonate
Magnesium oleic acid sulfate
Magnesium stearic acid sulfate
Magnesium lauric acid sulfate
Magnesium valeric acid sulfate
Magnesium palmitic acid sulfate
Magnesium capric acid sulfate
Magnesium sylvic acid sulfate It should be clearly understood that the foregoing examples are exemplary of the sulfate and sulfonate radical-containing dyestuffs and the sulfate and sulfonate radical-containing surface-active agents which can be used in the process of this invention. The examples, however, are not exhaustive, and it will be understood that other sulfate and sulfonate radical-containing dyestuffs, or sulfate and sulfonate, radical-containing surface-active agents can be employed with success. It should further be understood that sulfate radical-containing dyestuffs may be employed in conjunction with sulfonate radical-containing surfactants, and that sulfonate radical-containing dyestuffs may be employed in conjunction with sulfate radical-containing surfactants with success.

In other words, any of the enumerated dyestuffs may be used in conjunction with any of the enumerated surface-active agents, as well as with other sulfate or sulfonate surface-active agents, with success. It will be understood, however, that certain dyestuffs and surface-active agents will be found to provide a superior result. Preferred dyestuffs are: Trypan Red and a preferred surface-active agent for use in conjunction with these dyestuffs, specifically where the crystallization is carried out as a part of a metathetical reaction such as that described in the aforementioned patent application Ser. No. 149,978, is disodium 4-dodecylated oxydibenzene sulfonate. The potassium sulfate product manufactured by the process of this invention is characterized by a dyestuff dispersed throughout the crystal structure of the potassium sulfate crystals. This is a distinct advantage accruing only through the use of specific surface-active agents and dyestuffs of this invention. As will be illustrated by the following examples, the use of other reagents and dyestuffs results only in a temporary coloring of the product. That is, the dyestuff, if it adheres to the crystals at all, does so only to the crystal surface so that it is readily removed by washing or abrasion. The product of this invention contains the dyestuff dispersed through the crystal, whereby the color of the product is not altered by abrasion, washing or even breakage of the crystals. The product of this invention contains about 0.1 to about 1.0 pound of dyestuff per ton of product. It will be understood that within this range the amount of dyestuff may be varied to impart the desired color characteristic to the product.

EXAMPLE I

Metathetical reaction.—about 700 grams of refined potassium chloride was dissolved in 2,000 grams of water at 80–90° C. To solution batches thus formed, 1.5 cc. of sodium oleic acid sulfonate and the dyestuffs specified in Table I were added. To these admixtures 693 grams of langbeinite ground to 90% −200 mesh were added to each batch and the reaction was permitted to go to completion at 80 to 90° C. The mixtures were then cooled to 45° C. and held at this temperature for 4 to 6 hours. The product potassium sulfate was then separated by filtration, washed with water and methanol, and dried.

TABLE I

| Test No. | Dyestuff | Amount of dyestuff in pound/ton K₂SO₄ | Color of crystals |
| --- | --- | --- | --- |
| 3611-3-4 | Methylene blue, does not contain sulfate or sulfonic acid group | ca. 0.001 | Color washed off. |
| 3611-5-4 | Eriochrome Black TS, contains sulfonic acid group | 0.75 | Deep purple. |
| 3611-5-5 | Eriochrome Black TS, contains sulfonic acid group | 0.19 | Light purple. |
| 3611-6-1 | 1-amino-2 naphthol-4 sulfonic acid | 0.75 | Greenish-yellow. |
| 3611-6-2 | 1-nitroso-2 naphthol-3,6 disulfonic acid sodium salt | 0.75 | Yellow. |
| 3611-6-3 | Trypan Red, contains sulfonic acid groups | 0.75 | Red. |
| 3611-6-4 | Malachite green, does not contain sulfate or sulfonic acid group | 0.75 | Color washed off. |

It will be apparent from examination of Table I that color was imparted to the crystals in each case in which a sulfonate or sulfate radical-containing dyestuff was used in conjunction with the sodium oleic acid sulfonate. Where methylene blue and malachite green were employed, the color could readily be washed from the crystal surface to leave a clear colorless crystal.

EXAMPLE II

A number of samples were prepared by adding 350 grams of potassium sulfate to each 1,600 gram sample of water at 95° C., and surface-active agents and dyestuffs were added to the samples as indicated in Table II. The solutions were cooled to 30° C. The potassium sulfate crystals were separated by filtration and dried.

TABLE II

| Test No. | Cc. of sodium oleic acid sulfonate | Dyestuff added | Grams of dye added | Color of crystals |
| --- | --- | --- | --- | --- |
| 3611-12-3 | None | Eriochrome Black TS. | 0.04 | Colorless. |
| 3611-12-4 | 1.5 | do | 0.04 | Deep purple. |

It will be apparent from the foregoing table that the presence of the selected surfactant as well as the selected dyestuff is critical to the practice of the instant invention.

EXAMPLE III

Metathetical reaction.—about 1,050 grams of refined potassium chloride was dissolved in 3,000 grams of water at 55° C. To solution batches thus formed, a surfactant of the kind and in the amount indicated in Table III, and a dyestuff of the kind and in the amount indicated in Table III, were added. To these admixtures, 1,040 grams of langbeinite ground to 90% −200 mesh were added to each batch and the reaction was permitted to go to completion at 50 to 55° C. After 6 hours the product potassium sulfate was separated by filtration and washed with water and with methanol, and dried.

TABLE III

| Surfactant | | Dyestuff | | |
| --- | --- | --- | --- | --- |
| Name | Amount, cc. | Name | Amount, pounds/ton K₂SO₄ | Crystal color |
| Sodium oleic acid sulfonate. | 2.5 | Blue food color, contains sulfonic acid group. | 1.0 | Deep blue. |
| Sodium oleic acid sulfate. | 1.5 | Blue food color. | 1.0 | Do. |
| Sodium oleic acid sulfonate. | 2.5 | Indigosol Yellow I2G, contains sulfate group. | 10.0 | Deep yellow. |
| Sodium oleic acid sulfate. | 1.5 | Indigosol yellow I2G. | 10.0 | Do. |
| None | | do | 1.0 | Color washed off. |
| Sodium oleic acid sulfonate. | 2.5 | do | 1.0 | Yellow. |
| Disodium 4-dodecylated oxydibenzene sulfonate. | 2.0 | do | 0.5 | Do. |
| Do | 3.0 | Anthrasol Printing Blue IGG, contains sulfate group. | 2.0 | Green-blue. |

While the invention has been described with particular emphasis on the preferred embodiments thereof, and has been illustrated with specific examples and the enumeration of specific reagents which can be employed, it will be understood that, within the scope of the appended claims, the invention can be practiced otherwise than as specifically described.

The embodiments of the invention in which an exclusive property or privilege is claimed are defined as follows:

1. A crystalline potassium sulfate consisting essentially of potassium sulfate crystals having dispersed uniformly therethrough a sulfate or sulfonate radical-containing dyestuff in the amount of 0.1 to 1.0 pounds per ton of product.

2. The product in accordance with claim 1 in which said dyestuff is 1-amino-2 naphthol-4 sulfonic acid.

3. The product in accordance with claim 1 in which said dyestuff is the sodium salt of 1-nitroso-2 naphthol-3,6 disulfonic acid.

4. The product in accordance with claim 1 in which said dyestuff is

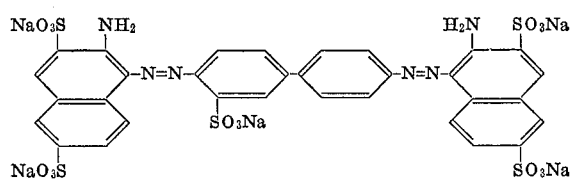

5. The method of making uniformly colored crystals of potassium sulfate comprising crystallizing potassium sulfate from an aqueous solution saturated with potassium sulfate and containing 0.001 to 0.05% by weight of a sulfate or sulfonate radical-containing dyestuff, and 0.025 to 0.200% by weight of a sulfate or sulfonate radical-containing surface-active agent.

6. The method in accordance with claim 5 in which said solution is maintained in saturated condition by cooling the solution as the potassium sulfate is crystallized.

7. The method in accordance with claim 5 in which said saturated solution is obtained by the reaction of potassium chloride with a solid complex salt of magnesium-potassium sulfate.

8. The method in accordance with claim 7 in which said complex salt is langbeinite.

9. The method in accordance with claim 8 in which surfactant is disodium 4-dodecylated oxydibenzene sulfonate.

10. The method in accordance with claim 9 in which said dyestuff is 1-amino-2 naphthol-4 sulfonic acid.

11. The method in accordance with claim 9 in which said dyestuff is the sodium salt of 1-nitroso-2 naphthol-3,6 disulfonic acid.

12. The method in accordance with claim 9 in which said dyestuff is

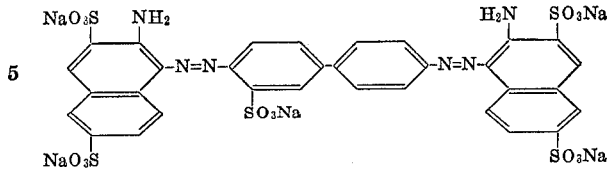

13. The method in accordance with claim 8 in which said dyestuff is present in the amount of about 0.005 to about 0.01% by weight and said surface active agent is present in the amount of about 0.03 to about 0.06% by weight.

References Cited
UNITED STATES PATENTS
3,063,800  11/1962  Dancy _____ 23—121

NORMAN G. TORCHIN, Primary Examiner
J. E. CALLAGHAN, Assistant Examiner

U.S. Cl. X.R.
23—121